United States Patent
Nara et al.

(10) Patent No.: US 11,867,949 B2
(45) Date of Patent: Jan. 9, 2024

(54) OPTICAL RECEPTACLE AND OPTICAL MODULE

(71) Applicant: Enplas Corporation, Saitama (JP)

(72) Inventors: Honoka Nara, Saitama (JP); Ayano Hinata, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 17/889,488

(22) Filed: Aug. 17, 2022

(65) Prior Publication Data

US 2023/0055328 A1  Feb. 23, 2023

(30) Foreign Application Priority Data

Aug. 20, 2021 (JP) ................. 2021-134692

(51) Int. Cl.
*G02B 6/32* (2006.01)
*G02B 6/42* (2006.01)
*G02B 6/38* (2006.01)

(52) U.S. Cl.
CPC ............ *G02B 6/32* (2013.01); *G02B 6/4292* (2013.01); *G02B 6/4296* (2013.01); *G02B 6/3813* (2013.01); *G02B 6/3881* (2013.01)

(58) Field of Classification Search
None
See application file for complete search history.

(56) References Cited

U.S. PATENT DOCUMENTS

| | | | | |
|---|---|---|---|---|
| 5,973,862 A * | 10/1999 | Hashizume | .......... | G02B 6/4245 385/35 |
| 6,283,644 B1 * | 9/2001 | Gilliland | .............. | G02B 6/4244 385/88 |
| 6,432,733 B1 * | 8/2002 | Hashizume | .......... | G02B 6/4245 438/22 |
| 6,550,983 B1 * | 4/2003 | Gilliland | .............. | G02B 6/4292 385/88 |
| 2004/0146252 A1 * | 7/2004 | Healy | .................. | G02B 6/4206 385/88 |
| 2005/0018981 A1 * | 1/2005 | Modavis | .............. | G02B 6/4292 385/92 |
| 2005/0185882 A1 * | 8/2005 | Zack | .................... | G02B 6/4256 385/15 |
| 2006/0093011 A1 | 5/2006 | Vancoille | | |
| 2006/0263015 A1 * | 11/2006 | Fincato | ................ | G02B 6/4201 385/92 |

(Continued)

FOREIGN PATENT DOCUMENTS

JP  2006-163372  6/2006

*Primary Examiner* — Jerry Rahll

(57) ABSTRACT

An optical receptacle includes: a first optical surface configured to allow, to enter the optical receptacle, light emitted from the photoelectric conversion element package, or emit, toward the photoelectric conversion element package, light travelled inside the optical receptacle; a second optical surface configured to emit, toward the optical transmission member, the light travelled inside the optical receptacle, or allow, to enter the optical receptacle, light emitted from the optical transmission member; a cylindrical part configured to house at least a part of the photoelectric conversion element package such that the first optical surface and the photoelectric conversion element face each other; and a first groove part disposed at a periphery of the first optical surface.

10 Claims, 8 Drawing Sheets

(56) References Cited

U.S. PATENT DOCUMENTS

2009/0304337 A1* 12/2009 Sato .................... G02B 6/4201
  385/92
2022/0373749 A1* 11/2022 Hiraka ................ G02B 6/4262

* cited by examiner

OPTICAL RECEPTACLE AND OPTICAL MODULE

CROSS REFERENCE TO RELATED APPLICATIONS

This application is entitled to and claims the benefit of Japanese Patent Application No. 2021-134692, filed on Aug. 20, 2021, the disclosure of which including the specification, drawings and abstract is incorporated herein by reference in its entirety.

TECHNICAL FIELD

The present invention relates to an optical receptacle and an optical module.

BACKGROUND ART

In the related art, an optical module including a light-emitting element such as a surface emitting laser (for example, vertical cavity surface emitting laser (VCSEL)), a light-receiving element such as a photodetector and the like is used for optical communications using optical transmission members such as optical fibers and light waveguides. The optical module includes one or more photoelectric conversion elements (light-emitting elements or light-receiving elements), and an optical receptacle for transmission, for reception or for transmission and reception.

PTL 1 discloses a resin lens structure (optical receptacle) including an objective surface (first optical surface) and an imaging surface (second optical surface). In the lens structure disclosed in PTL 1, a light source or a light detection device is fixed to the lens structure so as to face the objective surface, and an optical fiber is fixed to the lens structure so as to face the imaging surface. The lens structure disclosed in PTL 1 guides the light emitted from the light source to the end surface of the optical fiber, and guides the light emitted from the optical fiber to the light detection device.

CITATION LIST

Patent Literature

PTL 1
Japanese Patent Application Laid-Open No. 2006-163372

SUMMARY OF INVENTION

Technical Problem

As described above, the lens structure disclosed in PTL 1 is used in the field of optical communications. The lens structure is supposed to be used under a high temperature environment or a low temperature environment. When the lens structure disclosed in PTL 1 is used under a high temperature environment or a low temperature environment, however, it expands under the high temperature environment whereas it shrinks under the low temperature environment. When the lens structure expands or shrinks, the positional accuracy of the objective surface with respect to the light source or the light detection apparatus may not be maintained, and optical communications may not be appropriately performed.

An object of the present invention is to provide an optical receptacle that can suppress reduction in positional accuracy of the optical surface with respect to the photoelectric conversion element even when the surrounding temperature is changed. In addition, another object of the present invention is to provide an optical module including the optical receptacle.

Solution to Problem

An optical receptacle according to an embodiment of the present invention is configured to optically couple a photoelectric conversion element including and an optical transmission member when the optical receptacle is disposed between the optical transmission member and a photoelectric conversion element package including the photoelectric conversion element, the optical receptacle including: a first optical surface configured to allow, to enter the optical receptacle, light emitted from the photoelectric conversion element package, or emit, toward the photoelectric conversion element package, light travelled inside the optical receptacle; a second optical surface configured to emit, toward the optical transmission member, the light travelled inside the optical receptacle, or allow, to enter the optical receptacle, light emitted from the optical transmission member; a cylindrical part disposed to surround the first optical surface and configured to house at least a part of the photoelectric conversion element package such that the first optical surface and the photoelectric conversion element face each other; and a first groove part disposed at a periphery of the first optical surface. At least a part of a light path between the first optical surface and the second optical surface is surrounded by the first groove part.

An optical module according to an embodiment of the present invention includes: a photoelectric conversion element package including a photoelectric conversion element; and the optical receptacle according to claim 1 configured to optically couple the photoelectric conversion element and an optical transmission member.

Advantageous Effects of Invention

According to the present invention, it is possible to provide an optical receptacle that can suppress reduction in positional accuracy of the optical surface with respect to the photoelectric conversion element even when the surrounding temperature is changed. In addition, according to the present invention, it is possible to provide an optical module including the optical receptacle.

DESCRIPTION OF EMBODIMENTS

An optical module and an optical receptacle according to embodiments of the present invention are elaborated below with reference to the accompanying drawings.

Embodiment 1

Configuration of Optical Module

Figure 1A:
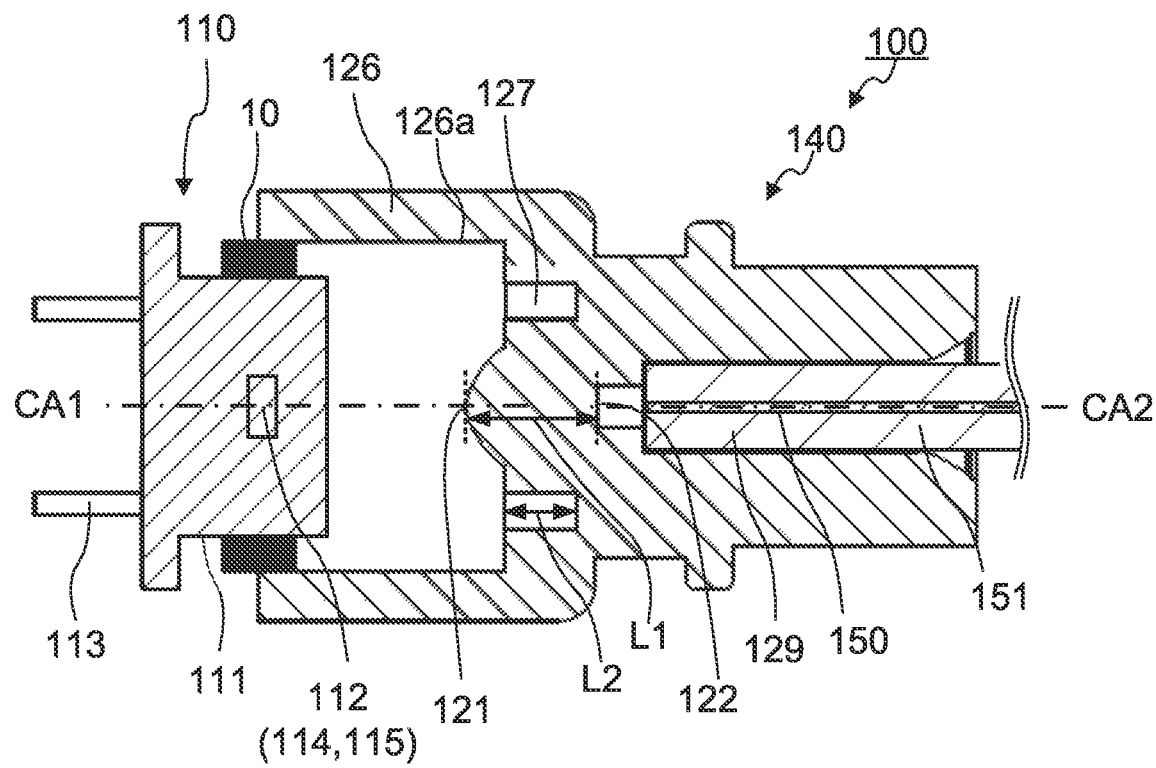
FIGS. 1A and 1B are sectional views of an optical module according to Embodiment 1.

FIG. 1A is a sectional view illustrating optical module 100 including photoelectric conversion element package 110 including photoelectric conversion element 112, and optical receptacle 140 for optically coupling photoelectric conversion element 112 and optical transmission member 150. This sectional view illustrates a cross-section of optical module 100 including first central axis CA1 of first optical surface 121 and second central axis CA2 of second optical surface 122 described later.

As illustrated in FIG. 1A, optical module 100 includes photoelectric conversion element package 110 and optical receptacle 140. In optical module 100, optical transmission member 150 and photoelectric conversion element 112 of photoelectric conversion element package 110 are optically coupled with each other through optical receptacle 140.

Optical module 100 may be an optical module for transmission or an optical module for reception. In the case where optical module 100 is an optical module for transmission, optical receptacle 140 guides, to the end surface of optical transmission member 150, light emitted from photoelectric conversion element package 110. In the case where optical module 100 is an optical module for reception, optical receptacle 140 guides, to photoelectric conversion element package 110, light emitted from the end surface of optical transmission member 150.

Photoelectric conversion element package 110 includes housing 111, photoelectric conversion element 112, and lead 113. Photoelectric conversion element 112 is disposed inside housing 111. Photoelectric conversion element package 110 is fixed to optical receptacle 140. In the present embodiment, photoelectric conversion element package 110 is fixed to optical receptacle 140 such that a part of it is housed in cylindrical part 126. More specifically, in the present embodiment, photoelectric conversion element package 110 is fixed to cylindrical part 126 through adhesive agent 10.

Photoelectric conversion element 112 is light-emitting element 114 or light-receiving element 115, and is disposed inside housing 111. In the case where optical module 100 is an optical module for transmission, photoelectric conversion element 112 is light-emitting element 114. In addition, in the case where optical module 100 is an optical module for reception, photoelectric conversion element 112 is light-receiving element 115. Light-emitting element 114 is a vertical cavity surface emitting laser (VCSEL), for example. Light-receiving element 115 is a photodetector, for example.

One end portion of lead 113 is connected to photoelectric conversion element 112. Lead 113 is disposed to protrude from the bottom surface of housing 111. The number of leads 113 is not limited. In the present embodiment, three leads 113 are provided. In addition, in the present embodiment, three leads 113 are disposed at even intervals in the circumferential direction in bottom view of photoelectric conversion element package 110.

When disposed between photoelectric conversion element package 110 and optical transmission member 150, optical receptacle 140 optically couples photoelectric conversion element package 110 including light-emitting element 114 or light-receiving element 115 and the end surface of optical transmission member 150. In the case where optical module 100 is an optical module for transmission, optical receptacle 140 allows incidence of light emitted from photoelectric conversion element 112 that is light-emitting element 114, and emits the incident light toward the end surface of optical transmission member 150. In the case where optical module 100 is an optical module for reception, optical receptacle 140 allows incidence of light emitted from the end surface of optical transmission member 150, and emits the light toward the light-receiving surface of photoelectric conversion element 112 that is light-receiving element 115.

The type of optical transmission member 150 is not limited. Examples of the type of optical transmission member 150 include an optical fiber and an optical waveguide. In the present embodiment, optical transmission member 150 is an optical fiber. The optical fiber may be of a single mode type, or a multiple mode type. In addition, in the present embodiment, optical transmission member 150 is housed inside ferrule 151, and is connected to optical receptacle 140 through ferrule 151. Ferrule 151 is a substantially cylindrical member configured to surround optical transmission member 150. Ferrule 151 is housed in ferrule housing part 129 of optical receptacle 140 described later with optical transmission member 150 housed inside.

Configuration of Optical Receptacle

As illustrated in FIG. 1A, optical receptacle 140 includes first optical surface 121, second optical surface 122, cylindrical part 126, first groove part 127, and ferrule housing part 129.

Optical receptacle 140 is a substantially cylindrical optical member. In the present embodiment, photoelectric conversion element package 110 is fixed to one end of optical receptacle 140 through cylindrical part 126, and optical transmission member 150 is fixed to the other end thereof through ferrule housing part 129.

Optical receptacle 140 is formed of a material that is optically transparent to the light of the wavelength used for the optical communications. Examples of the material of optical receptacle 140 include polyetherimide (PEI) such as ULTEM (registered trademark) and a transparent resin such as cyclic olefin resin. In addition, optical receptacle 140 may be manufactured through integral molding by injection molding, for example.

First optical surface 121 is an optical surface for allowing, to enter optical receptacle 140, light emitted from photoelectric conversion element package 110 (light-emitting element 114), or emitting, toward photoelectric conversion element package 110 (light-receiving element 115), light entered from second optical surface 122 and travelled inside optical receptacle 140. The shape of first optical surface 121 is not limited. First optical surface 121 may be a convex lens surface protruding toward photoelectric conversion element package 110, a concave lens surface recessed to photoelectric conversion element package 110, or a flat surface. In the present embodiment, first optical surface 121 is a convex lens surface protruding toward photoelectric conversion element package 110. The shape in plan view of first optical surface 121 is not limited. The shape in plan view of first optical surface 121 may be a circular shape or an elliptical shape. In the present embodiment, the shape in plan view of first optical surface 121 is a circular shape.

First central axis CA1 of first optical surface 121 may be or may not be perpendicular to the surface of photoelectric conversion element 112 (the light-emitting surface of light-emitting element 114 or the light-receiving surface of light-receiving element 115). In the present embodiment, first central axis CA1 is perpendicular to the surface of photoelectric conversion element 112 (the light-emitting surface of light-emitting element 114 or the light-receiving surface of light-receiving element 115). In addition, preferably, first central axis CA1 of first optical surface 121 coincides with the center of the surface of photoelectric conversion element package 110 (the light-emitting surface of light-emitting element 114 or the light-receiving surface of light-receiving element 115). Cylindrical part 126 disposed to surround first optical surface 121 (first central axis CA1) is provided around first optical surface 121.

Cylindrical part 126 is disposed to surround first optical surface 121. Cylindrical part 126 houses at least a part of photoelectric conversion element package 110, and sets first optical surface 121 and photoelectric conversion element 112 to face each other.

In the present embodiment, cylindrical part 126 has a ring shape in a cross-section orthogonal to first central axis CA1 of first optical surface 121.

Second optical surface 122 is an optical surface for emitting, toward the end surface of optical transmission member 150, light entered from first optical surface 121 and travelled inside optical receptacle 140, or allowing, to enter optical receptacle 140, light emitted from the end surface of optical transmission member 150. The shape of second optical surface 122 is not limited. Second optical surface 122 may be a convex lens surface protruding toward optical transmission member 150, a concave lens surface recessed to optical transmission member 150, or a flat surface. In the present embodiment, second optical surface 122 is a flat surface. The shape in plan view of second optical surface 122 is not limited. The shape in plan view of second optical surface 122 may be a circular shape or an elliptical shape. In the present embodiment, the shape in plan view of second optical surface 122 is a circular shape.

Second central axis CA2 of second optical surface 122 may be or may not be perpendicular to the end surface of optical transmission member 150. In the present embodiment, second central axis CA2 is perpendicular to the end surface of optical transmission member 150. Preferably, second central axis CA2 of second optical surface 122 coincides with the center of the end surface of optical transmission member 150.

First groove part 127 is disposed at the periphery of first optical surface 121. In the present embodiment, first groove part 127 is disposed between the base part of first optical surface 121 and the base part of cylindrical part 126. The shape of first groove part 127 in plan view is an annular shape. In addition, first groove part 127 is disposed to surround at least a part of the light path between first optical surface 121 and second optical surface 122. With optical receptacle 140 including the above-described first groove part 127, the displacement of the position of first optical surface 121 due to temperature change can be suppressed. This point will be described later with reference to FIG. 2A and FIG. 2B.

Ferrule housing part 129 houses ferrule 151. When ferrule housing part 129 houses ferrule 151, and the end portion of optical transmission member 150 and second optical surface 122 are disposed at opposite positions. It suffices that ferrule housing part 129 has a shape complementary to ferrule 151. In the present embodiment, since ferrule 151 has a cylindrical shape, ferrule housing part 129 has a cylindrical shape including a space that can house ferrule 151.

Figure 2A:
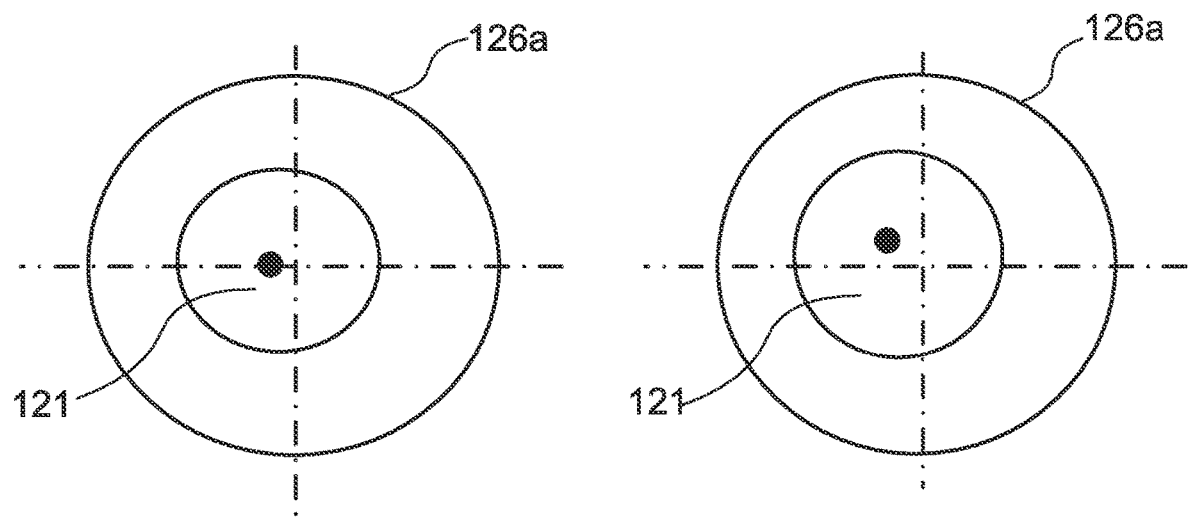
FIG. 2A is a diagram for describing a positional displacement of the center of a first optical surface of an optical receptacle according to a comparative example.
Figure 2B:
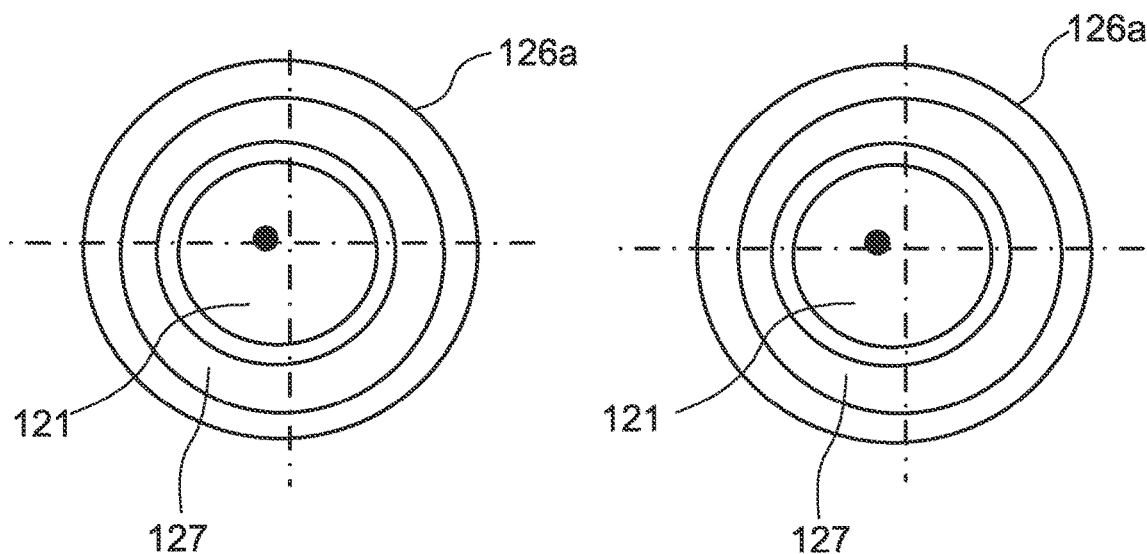
FIG. 2B is a diagram for describing a positional displacement of the center of the first optical surface of the optical receptacle according to Embodiment 1.

FIG. 2A illustrates the actual position of the center of first optical surface 121, the position (design position) where the center of first optical surface 121 should be located, and inner surface 126a of the cylindrical part in an optical module of a comparative example with no first groove part 127. On the other hand, FIG. 2B illustrates the actual position of the center of first optical surface 121 and the position (design position) where the center of first optical surface 121 should be located, and inner surface 126a of the cylindrical part in optical module 100 of Embodiment 1 including first groove part 127 disposed at the periphery of first optical surface 121. In FIGS. 2A and 2B, the black circle indicates the center of first optical surface 121, and the intersection of the dashed lines indicates the position (design position) where the center of first optical surface 121 should be located.

The left diagram of each of FIGS. 2A and 2B illustrates a relationship between the position of the center of first optical surface 121 and the position where the center of first optical surface 121 should be located at normal temperature. On the other hand, the right diagram of each of FIGS. 2A and 2B illustrates a relationship between the position of the center of first optical surface 121 and the position where the center of first optical surface 121 should be located at high temperature.

As shown in the left diagram and right diagram of FIG. 2A, in the optical module of the comparative example, when the temperature becomes a high temperature in the case where the position is displaced from the position where the center of first optical surface 121 should be located at normal temperature, the amount of the displacement increases. As a result, when the temperature becomes a high temperature, the light coupling efficiency is largely reduced. The reason for this is that in the optical module of the comparative example, the resin around the first optical surface 121 is expanded and the center of first optical surface 121 is displaced.

Conversely, in optical module 100 of the embodiment including first groove part 127, the displacement between the center of first optical surface 121 and the position where the center of the first optical surface should be located is small even at a high temperature as shown in the left diagram and right diagram of FIG. 2B. The reason for this is that in optical module 100 of Embodiment 1, first groove part 127 is disposed around first optical surface 121 and there is only a small portion that expand or shrink due to the temperature change around first optical surface 121.

From the viewpoint of suppressing the positional displacement of the center of first optical surface 121, it is preferable that the depth of the groove of first groove part 127 be greater than the smallest width of the groove. When first groove part 127 has a depth to a certain degree, first optical surface 121 is independent of the expansion and shrinkage of the surrounding material, and the displacement of the position of first optical surface 121 due to temperature change is easily suppressed.

In addition, in first groove part 127, it is preferable that in the direction along the light path, L2/L1, which is the ratio of depth L2 of first groove part 127 to length L1 from the apex of first optical surface 121 to the second optical surface be 0.3 or greater, more preferably 0.5 or greater. With first groove part 127 having the above-described configuration, the positional displacement of the center of the first optical surface is easily suppressed. The upper limit of L2/L1 is not limited, but is preferably 1.5 or smaller from the viewpoint of maintaining the rigidity of optical receptacle 140. Note that in the example illustrated FIG. 1A, the bottom of first groove part 127 is located at a position closer to first optical surface 121 than second optical surface 122 in the direction along the light path (see and compare with FIG. 1B described later).

Figure 1B:
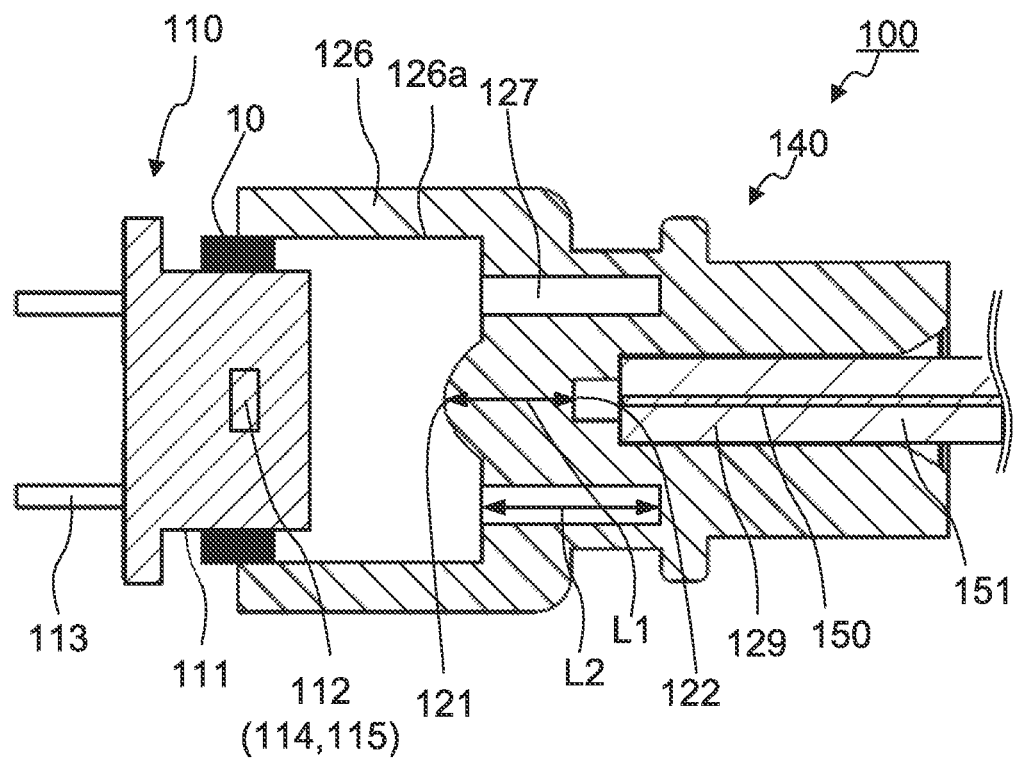

FIG. 1B is a sectional view illustrating another example of optical module 100 according to Embodiment 1. As illustrated in FIG. 1B, in this optical module 100, second optical surface 122 is located at a position closer to first optical surface 121 than the bottom of first groove part 127 in the direction along the light path. In this manner, first groove part 127 is disposed also around second optical surface 122. In this optical module 100, the positional displacement of the center of second optical surface 122 due to temperature change can also be suppressed as with first optical surface 121.

Effect

With optical receptacle 140 according to Embodiment 1, even when the temperature around optical receptacle 140 is changed, the positional displacement of first optical surface 121 can be suppressed and optical communications can be appropriately performed.

Embodiment 2

Figure 3:
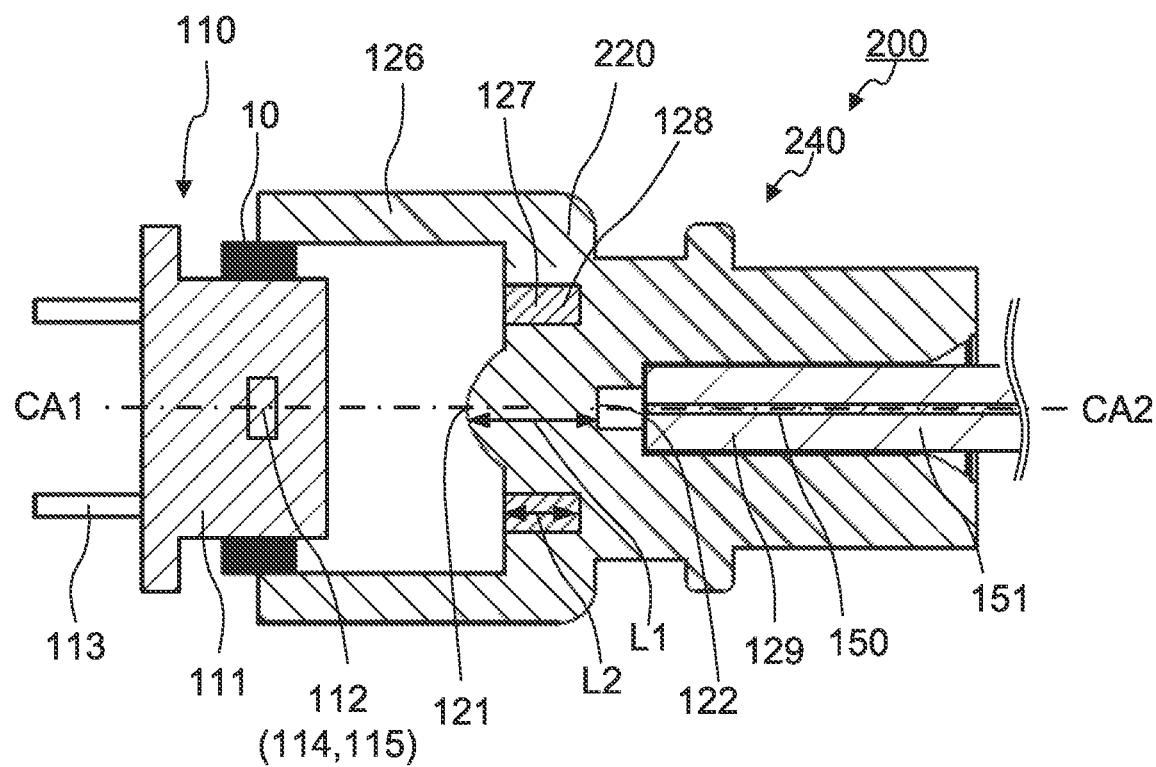
FIG. 3 is a sectional view of an optical module according to Embodiment 2.

FIG. 3 illustrates optical module 200 according to Embodiment 2. Optical module 200 is different from optical module 100 according to Embodiment 1 in that it further includes deformation suppression material 128 disposed in first groove part 127. The members of optical module 200 similar to those of optical module 100 are denoted with the same reference numerals and the description thereof will be omitted.

As illustrated in FIG. 3, deformation suppression material 128 is disposed in first groove part 127. In optical receptacle 240 according to Embodiment 2, when the portion including first optical surface 121, second optical surface 122, cylindrical part 126 and first groove part 127 is set as optical receptacle main body 220, deformation suppression material 128 is a material with a lower linear expansion coefficient than the material of optical receptacle main body 220. By using such a deformation suppression material 128, the displacement of the position of the center of first optical surface 121 can be further suppressed at high temperature and at low temperature. Note that examples of deformation suppression material 128 include (a cured product of) an adhesive agent.

Figure 4A:
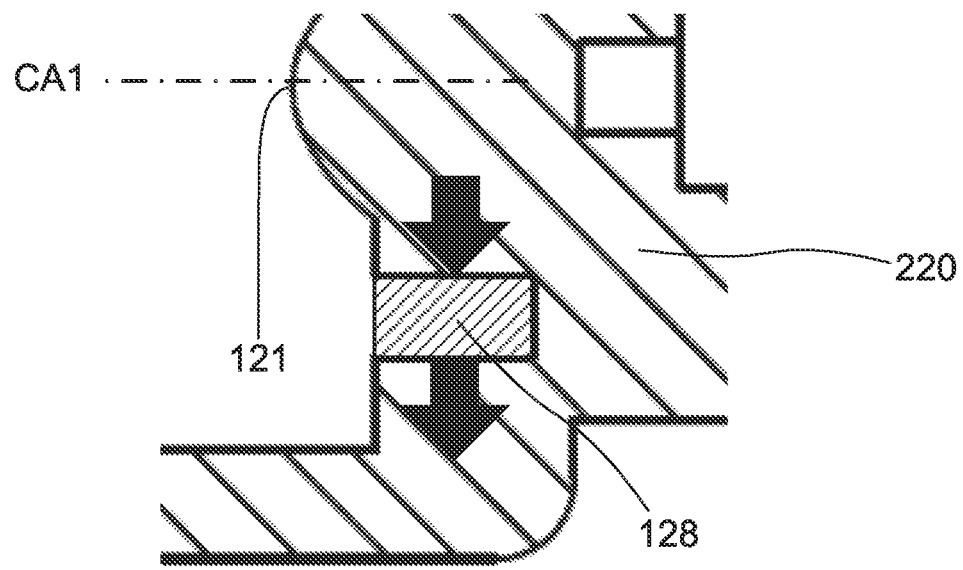
FIGS. 4A and 4B are diagrams for describing a state where a deformation suppression material suppresses the deformation of the optical receptacle in the optical receptacle according to Embodiment 2.
Figure 4B:
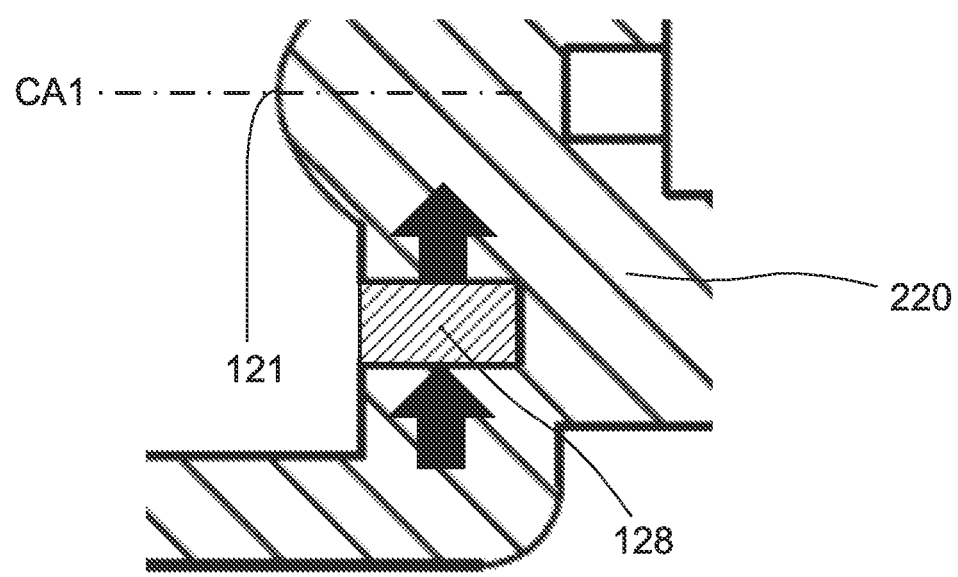

FIGS. 4A and 4B are diagrams for describing a state where the positional displacement of the center of first optical surface 121 is suppressed at high temperature and at low temperature with deformation suppression material 128. As illustrated in FIG. 4A, when the temperature is high, a force in the direction away from first central axis CA1 of first optical surface 121 acts on first optical surface 121 due to expansion of optical receptacle main body 220, but the expansion of optical receptacle main body 220 is suppressed with deformation suppression material 128. On the other hand, as illustrated in FIG. 4B, when the temperature is low, a force in a direction toward first central axis CA1 of first optical surface 121 acts on first optical surface 121 due to shrinkage of optical receptacle main body 220, but the shrinkage of optical receptacle main body 220 is suppressed with deformation suppression material 128. In the above-described manner, with deformation suppression material 128, the positional displacement of the center of first optical surface 121 is further suppressed at high temperature and at low temperature.

Figure 5A:
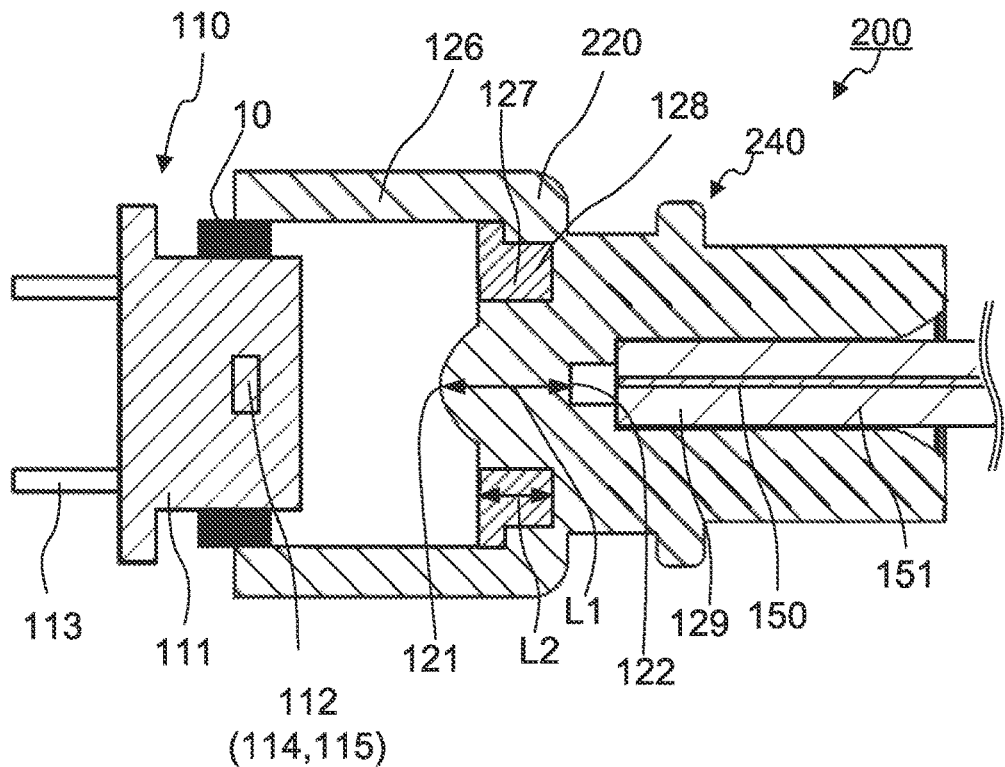
FIGS. 5A and 5B are sectional views of the optical module according to Embodiment 2.

It suffices that deformation suppression material 128 is disposed in accordance with the configuration of first groove part 127. For example, in the case where first groove part 127 has an annular shape with a constant width as illustrated in FIG. 3, it suffices that deformation suppression material 128 is supplied in the annular first groove part 127. In addition, for example, in the case where first groove part 127 has an annular portion with a wide width on first optical surface 121 side and an annular portion with a narrow width on the second optical surface side as illustrated in FIG. 5A, it suffices that deformation suppression material 128 is supplied in the annular portion with the wide width and the annular portion with the narrow width.

Figure 5B:
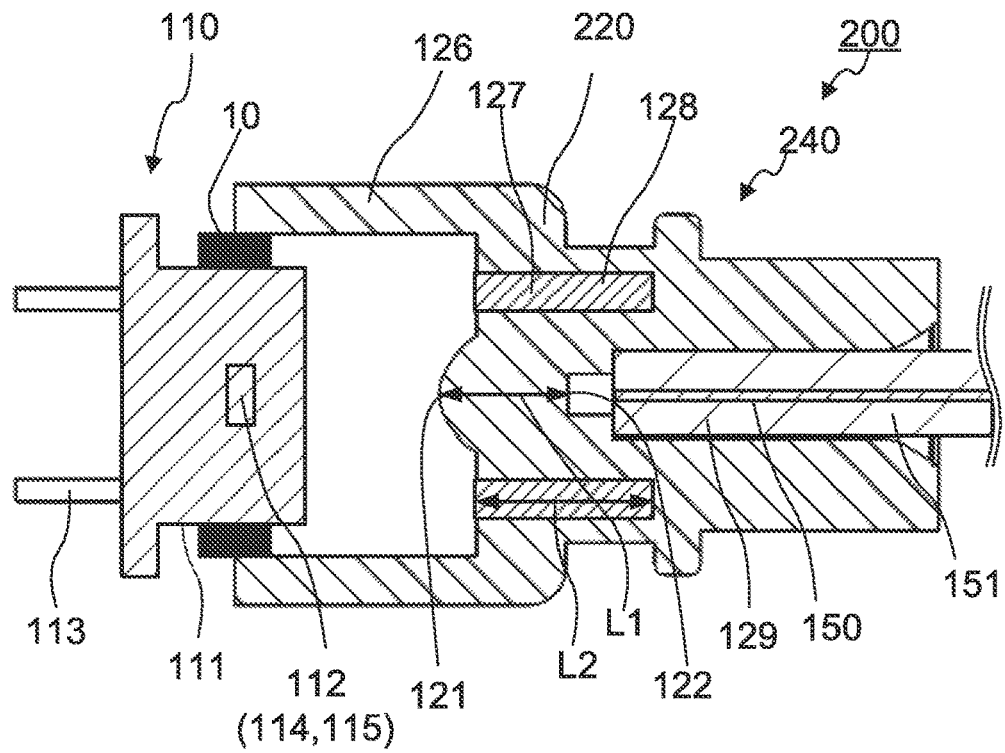

In addition, for example, in the case where the bottom of first groove part 127 is located on optical transmission member 150 side than second optical surface 122 in the direction along the light path as illustrated in FIG. 5B, it suffices that deformation suppression material 128 is disposed in accordance with it. With deformation suppression material 128 disposed in the above-described manner, the positional displacement of the center of second optical surface 122 is further suppressed.

Effect

With optical receptacle 240 according to Embodiment 2, even when the temperature around the optical receptacle is changed, the positional displacement of the first optical surface can be suppressed and optical communications can be appropriately performed.

Embodiment 3

Figure 6A:
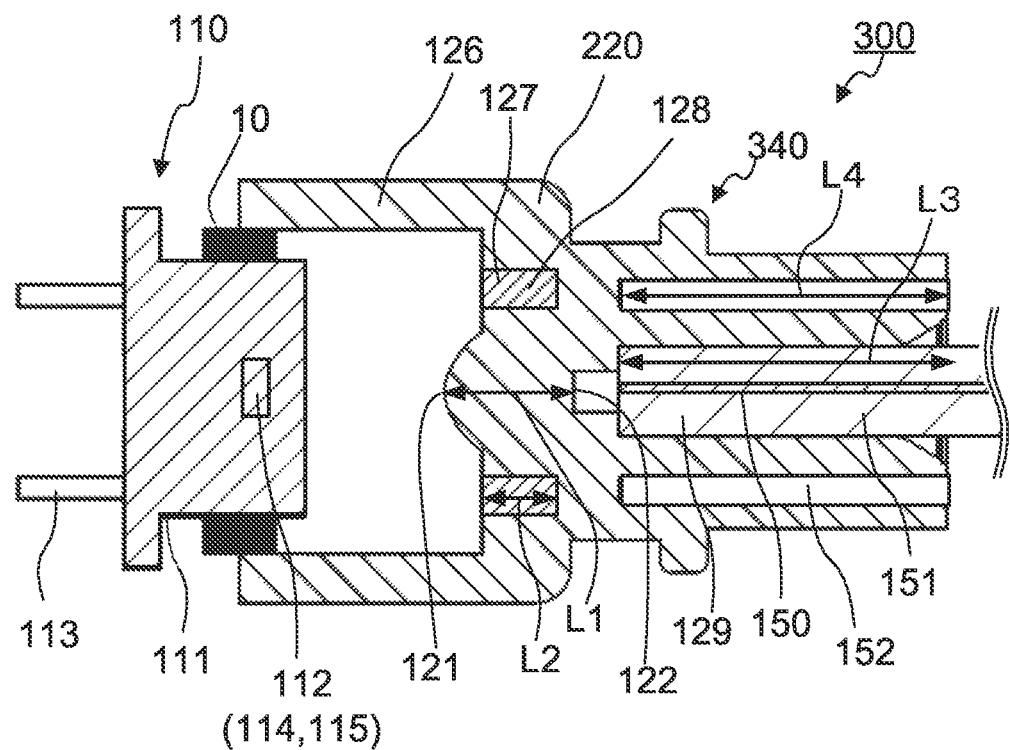
FIGS. 6A and 6B are sectional views of an optical module according to Embodiment 3.
Figure 6B:
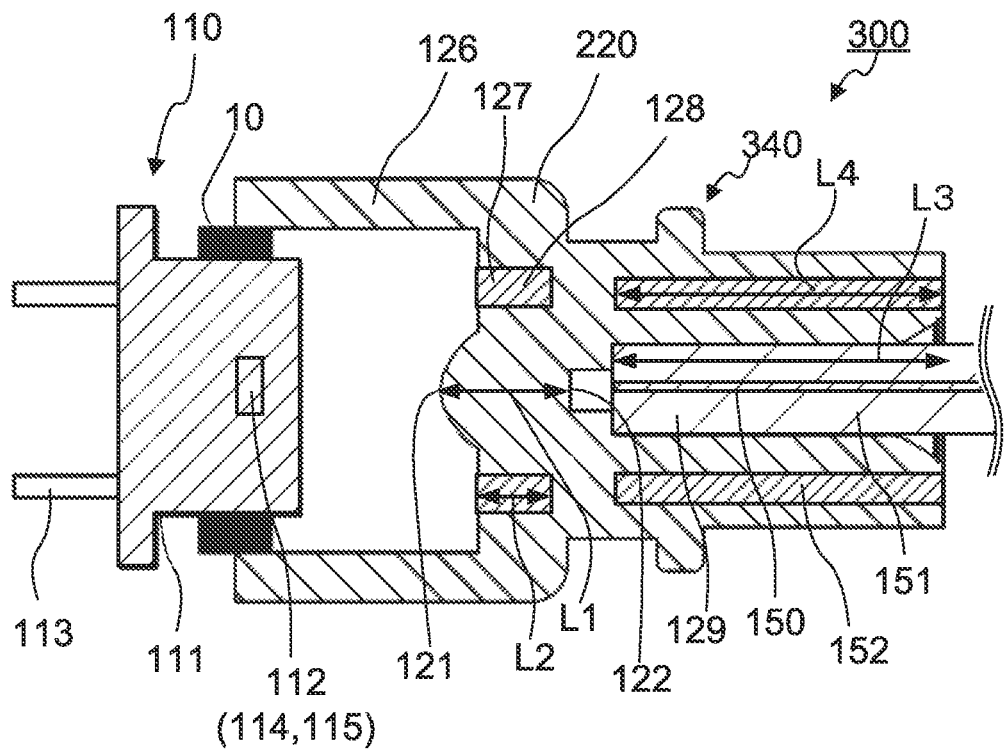
Figure 7:
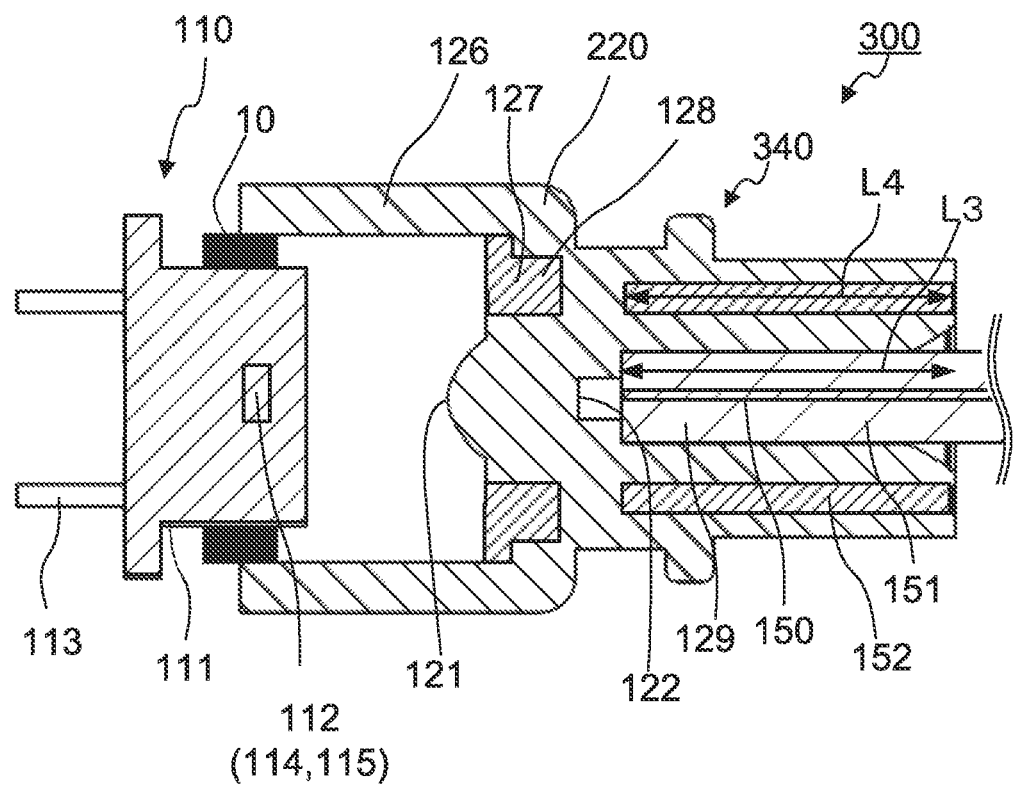
FIG. 7 is a sectional view of the optical module according to Embodiment 3.

FIGS. 6A, 6B and 7 are sectional views of optical module 300 according to Embodiment 3. Optical receptacle 340 of optical module 300 is different from optical receptacles 140 and 240 of Embodiments 1 and 2 in that it includes second groove part 152 disposed around ferrule housing part 129. The members of optical module 300 similar to those of optical modules 100 and 200 are denoted with the same reference numerals and the description thereof will be omitted.

As described above, optical receptacle 340 includes second groove part 152 disposed around ferrule housing part 129. With optical receptacle 340 including second groove part 152, the displacement of the position of ferrule housing part 129 with respect to second optical surface 122 due to temperature change can be suppressed. The mechanism that can suppress the positional displacement of ferrule housing part 129 with respect to second optical surface 122 with second groove part 152 is the same as the above-described mechanism that can suppress the positional displacement of first optical surface 121 with first groove part 127.

From the viewpoint of suppressing the positional displacement of ferrule housing part 129, it is preferable that in second groove part 152, the depth of the groove be greater than the width of the groove. In addition, it is preferable that in second groove part 152, L4/L3, which is the ratio of depth L4 of the second groove part with respect to the depth L3 of ferrule housing part 129, be 0.4 or greater in the direction along the light path. With second groove part 152 having the above-described configuration, the positional displacement of ferrule housing part 129 can be easily suppressed. The upper limit of L4/L3 is not limited, but is preferably 1.0 or smaller from the viewpoint of maintaining the rigidity of optical receptacle 340, for example.

In addition, in second groove part 152, deformation suppression material 128 may not be disposed as illustrated in FIG. 6A, or deformation suppression material 128 may be disposed as illustrated in FIGS. 6B and 7. Deformation suppression material 128 is a material with a lower linear expansion coefficient than the material of optical receptacle main body 220. The mechanism of suppressing the positional displacement of ferrule housing part 129 with deformation suppression material 128 disposed in second groove part 152 is the same as the mechanism with which deformation suppression material 128 can suppress the positional displacement of first optical surface 121 in Embodiment 2.

Note that in Embodiment 3, in first groove part 127, deformation suppression material 128 may not be disposed as in Embodiment 1, or deformation suppression material 128 may be disposed as in Embodiment 2. In the case where deformation suppression material 128 is disposed in first groove part 127, it suffices that deformation suppression material 128 is disposed in accordance with the configuration of first groove part 127 as illustrated in FIGS. 6B and 7. This is the same as in Embodiment 2.

More specifically, as illustrated in FIG. 6B, in the case where first groove part 127 has an annular shape with a constant width, it suffices that deformation suppression material 128 is supplied to the annular first groove part 127. In addition, in the case where first groove part 127 has an annular portion with a wide width on first optical surface 121 side and an annular portion with a narrow width on second optical surface 122 side as illustrated in FIG. 7, it suffices that deformation suppression material 128 is supplied to the annular portion with the wide width and the annular portion with the narrow width.

Effect

With optical receptacle 340 according to Embodiment 3, even when the temperature around optical receptacle 340 is changed, the positional displacement of ferrule housing part 129 with respect to second optical surface 122 can be suppressed and optical communications can be appropriately performed.

Embodiment 4

Figure 8:
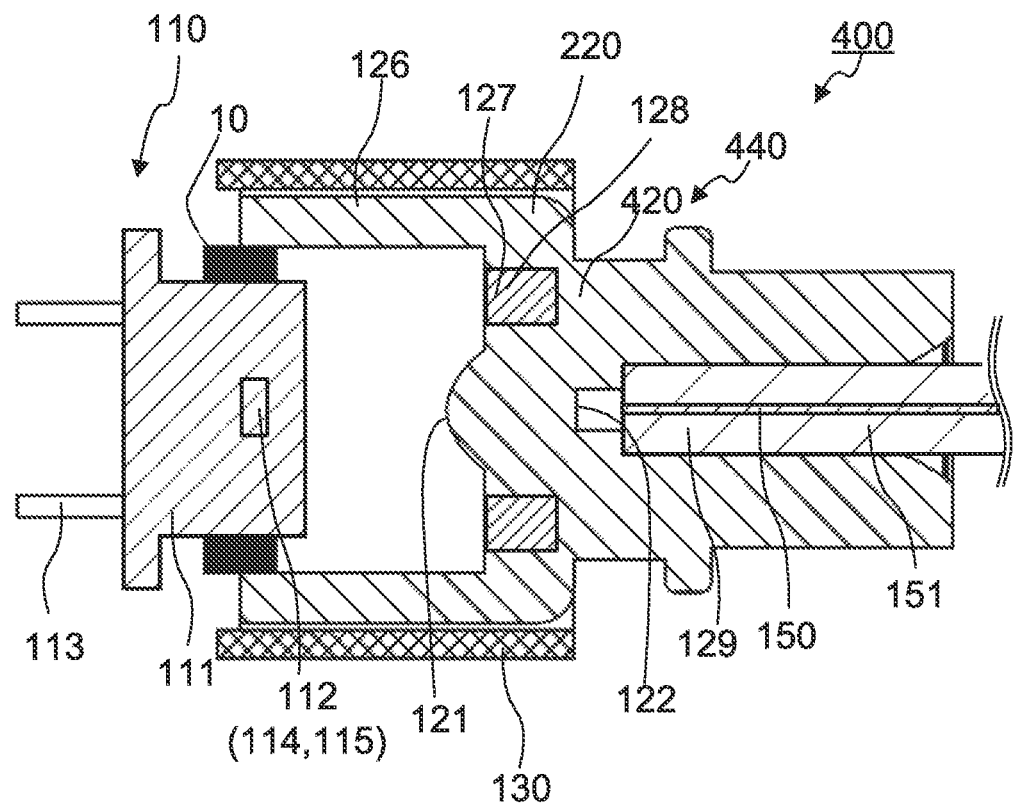
FIG. 8 is a sectional view of an optical module according to Embodiment 4.

FIG. 8 is a sectional view of optical module 400 according to Embodiment 4. Optical module 400 is different from the optical modules according to Embodiments 1, 2 and 3 in that optical receptacle 440 further includes deformation suppression member 130 configured to surround optical receptacle main body 420 and composed of a material with a smaller linear expansion coefficient than optical receptacle main body 420. Examples of the material with a smaller linear expansion coefficient than optical receptacle main body 420 include metals and resins. The members of optical module 400 similar to those of optical module 100 are denoted with the same reference numerals and the description thereof will be omitted.

Deformation suppression member 130 is disposed to surround at least a part of the light path between first optical surface 121 and second optical surface 122. Preferably, deformation suppression member 130 and optical receptacle main body 420 are joined to each other. With the deformation suppression member is joined in such a manner as to surround optical receptacle main body 420, the deformation of optical receptacle main body 420 is suppressed even when optical receptacle main body 420 expands or shrinks due to temperature change.

Note that optical receptacle 440 may or may not include second groove part 152 disposed around ferrule housing part 129. In addition, deformation suppression material 128 may be or may not be disposed in first groove part 127 or second groove part 152.

Effect

With optical receptacle 440 according to Embodiment 4, even when the temperature around optical receptacle 440 is changed, the deformation of optical receptacle main body 420 can be suppressed, the positional displacement of the center of first optical surface 121 can be suppressed and optical communications can be appropriately performed.

INDUSTRIAL APPLICABILITY

The optical receptacle and the optical module according to the embodiment of the present invention are suitable for optical communications using optical transmission members.

REFERENCE SIGNS LIST

10 Adhesive agent
100, 200, 300, 400 Optical module
110 Photoelectric conversion element package
111 Housing
112 Photoelectric conversion element
113 Lead
114 Light-emitting element
115 Light-receiving element
220, 420 Optical receptacle main body
121 First optical surface
122 Second optical surface
126 Cylindrical part
126a Inner surface of cylindrical part
127 First groove part
128 Deformation suppression material
129 Ferrule housing part
130 Deformation suppression member
140, 240, 340, 440 Optical receptacle
150 Optical transmission member
151 Ferrule
152 Second groove part
CA1 First central axis
CA2 Second central axis

The invention claimed is:

1. An optical receptacle configured to optically couple a photoelectric conversion element including and an optical transmission member when the optical receptacle is disposed between the optical transmission member and a photoelectric conversion element package including the photoelectric conversion element, the optical receptacle comprising:
   a first optical surface configured to allow, to enter the optical receptacle, light emitted from the photoelectric conversion element package, or emit, toward the photoelectric conversion element package, light travelled inside the optical receptacle;
   a second optical surface configured to emit, toward the optical transmission member, the light travelled inside the optical receptacle, or allow, to enter the optical receptacle, light emitted from the optical transmission member;
   a cylindrical part disposed to surround the first optical surface and configured to house at least a part of the photoelectric conversion element package such that the first optical surface and the photoelectric conversion element face each other; and a first groove part disposed at a periphery of the first optical surface, wherein at least a part of a light path between the first optical surface and the second optical surface is surrounded by the first groove part.

2. The optical receptacle according to claim 1, wherein in the first groove part, a depth of the groove is greater than a smallest width of the groove.

3. The optical receptacle according to claim 1, wherein in a direction along the light path, L2/L1 is 0.3 or greater, the L2/L1 being a ratio of a depth L2 of the first groove part with respect to a length L1 from an apex of the first optical surface to the second optical surface.

4. The optical receptacle according to claim 1, wherein in a direction along the light path, the second optical surface is located at a position closer to the first optical surface than a bottom of the first groove part.

5. The optical receptacle according to claim 1, wherein the optical receptacle includes:

an optical receptacle main body including the first optical surface, the second optical surface, the cylindrical part and the first groove part; and a deformation suppression material disposed in the first groove part and having a linear expansion coefficient lower than that of a material of the optical receptacle main body.

6. The optical receptacle according to claim 1, further comprising:

a ferrule housing part configured to house a ferrule and set the second optical surface and an end portion of the optical transmission member to face each other, wherein the optical transmission member is disposed inside the ferrule; and a second groove part disposed at a periphery of the ferrule housing part, wherein when the ferrule is housed in the ferrule housing part, at least a part of the ferrule is surrounded by the second groove part.

7. The optical receptacle according to claim 6, wherein in the second groove part, a depth of the groove is greater than a width of the groove.

8. The optical receptacle according to claim 6, wherein in a direction along the light path, L4/L3 is 0.4 or greater, the L4/L3 being a ratio of a depth L4 of the second groove part with respect to a depth L3 of the ferrule housing part.

9. The optical receptacle according to claim 6, wherein the optical receptacle includes:

an optical receptacle main body including the first optical surface, the second optical surface, the cylindrical part, the first groove part, the ferrule housing part and the second groove part; and a deformation suppression material disposed in the second groove part and having a linear expansion coefficient lower than that of a material of the optical receptacle main body.

10. An optical module, comprising:

a photoelectric conversion element package including a photoelectric conversion element; and the optical receptacle according to claim 1 configured to optically couple the photoelectric conversion element and an optical transmission member.

* * * * *